Patented Aug. 22, 1939

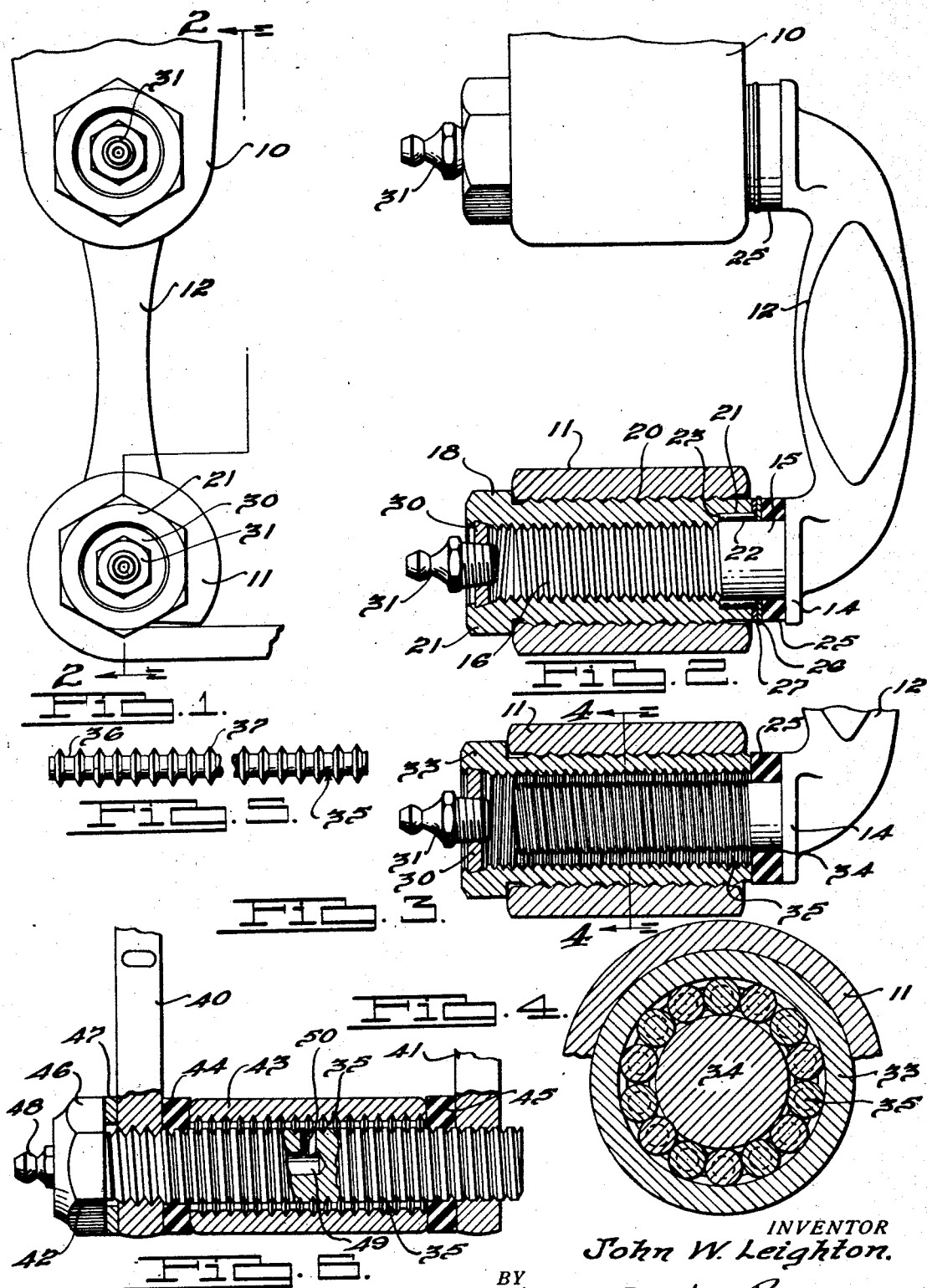

2,170,455

UNITED STATES PATENT OFFICE 2,170,455

ROLLER BEARING SHACKLE

John W. Leighton, Port Huron, Mich.

Application October 17, 1936, Serial No. 106,107

2 Claims. (Cl. 287—93)

The invention relates to oscillatory joints and it has particular relation to a joint having a pivotal, threaded bearing.

One object of the invention is to provide an improved oscillatory joint which has substantially all of the advantages of a pivotal threaded bearing while obtaining certain advantages of a roller bearing joint.

Another object of the invention is to provide a joint which combines the features of a pivotal threaded bearing and a roller bearing and which is simple in construction, economical to manufacture, and which may be assembled without difficulty.

Another object of the invention is to provide an oscillatory joint generally of the aforesaid character, which is particularly adapted for use in connection with U-shaped shackles.

Other objects of the invention will become apparent from the following specification, the drawing relating thereto, and from the claims hereinafter set forth.

For a better understanding of the invention, reference may be had to the drawing wherein Figure 1 is a side elevational view illustrating a U-shaped shackle constructed according to one form of the present invention.

Fig. 2 is a cross sectional view taken substantially along the line 2—2 of Fig. 1.

Fig. 3 is a fragmentary cross-sectional view of a similar shackle embodying another form of the invention.

Fig. 4 is a cross-sectional view on a larger scale taken substantially along the line 4—4 of Fig. 3.

Fig. 5 is a detailed view illustrating one of the roller bearings embodied in the structure shown by Figures 3 and 4.

Fig. 6 is a fragmentary cross-sectional view of another type of shackle embodying a roller bearing arrangement substantially like that shown by Fig. 3.

Referring to Figures 1 and 2, a bracket mounted on the frame of the automobile is indicated at 10, a spring eye on the end of a leaf spring is indicated at 11, and a U-shaped shackle bolt pivotally connecting the bracket and eye is indicated at 12. In general this assembly is not new and the present invention is concerned only with the pivotal connection between one or both ends of the U bolt and the bracket and spring eye.

Referring now to the cross-sectional view in Fig. 2, it will be noted that the lower end of the U bolt has a shoulder 14 at its inner end, a cylindrical portion 15 outwardly of and adjacent to the shoulder and a threaded major portion 16 outwardly of the cylindrical portion 15. A bushing 18 is threaded on the portion 16 of the U bolt to provide a threaded pivotal bearing and the external surface of the bushing is provided with shallow threads 20 that threadedly engage the interior surface of the spring eye 11. When the bushing is threaded tightly into the spring eye, a hexagonal head 21 on the outer end of the bushing jams against the end of the eye and this, in conjunction with the shallow nature of the threads 20, tightly locks the bushing in the spring eye against rotation therein.

The inner end of the bushing over a minor portion of its length has an enlarged internal diameter 21 overlying a portion of the cylindrical part 15 of the U bolt and between this enlarged diameter of the bushing and the cylindrical part, an annular series of roller bearings 22 are provided. The outer ends of these rolers engage an annular shoulder 23 at the inner end of the threads on the bushing and this serves to locate the outer ends of the rollers. A resilient sealing element 25 is positioned on the cylindrical portion 15 in engagement with the shoulder 14 and a washer 26 is disposed between this element and the ends of the rollers. A second smaller washer 27 is provided between the washer 26 and the end face of the bushing and this second washer extends around the ends of the rollers. The arrangement of parts is such that when the bushing 18 is threaded into the spring eye, its inner end is tightly forced against the washers and hence against the resilient element 25 and this insures a tight seal for preventing leaks of lubricant from the end of the joint. It likewise of course prevents ingress of dirt. It will be appreciated that the rollers will be held in axial position between the washer 26 and the shoulder 23, although the washer 26 can, if the forces are sufficient, resiliently "give" and accordingly the rollers never can be bound undesirably by axial forces.

The outer end of the bushing is closed by means of a Welch plug 30 having a grease fitting 31 threaded thereinto, so as to provide for lubrication. Inasmuch as the threaded engagement between the bolt and the bushing is of pivotal character, necessarily there is some clearance and the lubricant under pressure can readily travel to the inner end of the threads. However, the seal is always positive and resilient even though some oscillation of the joint should tend to move the bushing outwardly with respect to the bolt. Preferably, the resilient element 25 is composed of rubber and therefore it is constantly under compressive forces or is in a state of compression, so that it constantly maintains a seal even during oscillatory movement of the bushing and bolt respectively.

It will be appreciated that the joint assembly is of the pivotal threaded bearing type inasmuch as the threads extend substantially throughout the length of the bushing. However, the rollers at the inner end of the bolt assist in maintaining the bushing and bolt accurately centered and therefore provide a smooth oscillatory bearing. In some cases there is a tendency for slight noises to occur in a pivotal threaded bearing due to the clearances, especially when the oscillatory parts tend to move relatively in a vertical direction. On the other hand, the threaded bearing cooperates in preventing relative sidewise movement of the oscillatory parts of the joint.

Referring to Figure 3, a similar arrangement is provided, but in this case the bushing indicated at 33 is threaded internally to its inner end and the leg of the U bolt is substantially the same as shown in Figure 2, excepting that it has a shorter cylindrical portion 34. Additionally, the diameter of the threaded portion, as well as the portion 34, is smaller than the diameter of the leg in the structure shown by Figure 2, and the internal diameter of the bushing is slightly larger than the internal diameter of the bushing shown in Figure 2. Between the internal threads on the bushing and the external threads on the bolt, a series of rollers 35 is provided, and as best shown by Figure 5, each of the rollers has alternating recesses 36 and ridges 37. The bases of the recesses are cylindrical and it will be noted in Figure 5 that the apices of the threads on the bushing and on the bolt are similarly flattened so as to cooperate with the flat bases of the recesses. Accordingly, the rollers have an interfitting, rolling engagement with the threaded surfaces. In an oscillatory movement of the joint, the rollers will turn on their own axes and roll on the threads and some, although slight, inward and outward movement of the rollers along the axis of the joint will naturally occur. The inner end of the joint is sealed by one of the rubber sealing elements 26 which engages the shoulder 14 on the bolt and the inner end face of the bushing. It of course will be understood that this element, which is preferably composed of rubber, will be constantly under pressure and therefore will seal the end of the joint even if some relative longitudinal movement of the bolt and bushing occurs due to oscillation on the threads.

According to Figure 6, the same type of joint, as shown by Figure 3, is provided, excepting that side bars 40 and 41 are provided that may form part of the conventional type of side bar shackle. In this construction, the bolt 42 is threaded through the bar 40, through a spring eye 43, and through the side bar 41. Beyond the side bar 40, the threads on the bolt have flattened apices similar to the threads on the bolt in Fig. 3, and between the internal threads in the eye and the external threads on the bolt, a series of the rollers 35 is provided. Rubber sealing elements 44 and 45 are provided between the ends of the eye 43 and the bars 40 and 41 respectively. It will be understood that the bolt is locked to the bars 40 and 41, but that the eye 43 is oscillatory on the bolt. This locking may be effected by means of a head 46 on the bolt outwardly of the bar 40 which abuts a sealing washer 47, so that when the bolt is tightened, the threaded engagement between the bolt and bars locks the bolt in place. A grease fitting 48 and passages 49 and 50 in the bolt enable lubricating the roller bearings and threads.

Although more than one form of the invention has been illustrated and described in detail, it will be apparent to those skilled in the art that various modifications may be made without departing from the scope of the appended claims.

What is claimed is:

1. A joint comprising outer and inner relatively rotatable members having internal and external threads respectively, and a series of elongated rollers between the threads and having alternating circular grooves and ridges for receiving the threads.

2. A joint comprising outer and inner relatively rotatable members having internal and external threads respectively, said threads having flattened apices so as to provide substantially cylindrical bearing surfaces, and a series of rollers between the threads and having circular grooves and flattened portions for receiving the threads and engaging the flattened thread apices.

JOHN W. LEIGHTON.